United States Patent [19]

Arvidsson

[11] Patent Number: 5,227,796
[45] Date of Patent: Jul. 13, 1993

[54] METHOD OF DETECTING THE DIVISION OF A RADAR TARGET

[75] Inventor: Erik R. Arvidsson, Västra Frölunda, Sweden

[73] Assignee: Telefonaktiebolaget L M Ericsson, Stockholm, Sweden

[21] Appl. No.: 866,854

[22] Filed: Apr. 10, 1992

[30] Foreign Application Priority Data

Apr. 12, 1991 [SE] Sweden .............................. 9101109

[51] Int. Cl.⁵ .............................................. G01S 13/44
[52] U.S. Cl. ........................................ 342/13; 342/149
[58] Field of Search ...................... 342/13, 17, 90, 149

[56] References Cited

U.S. PATENT DOCUMENTS 3,089,136 5/1963 Albersheim .
4,136,343 1/1979 Heffner et al. .
4,193,074 3/1980 Schwartz et al. .
4,646,095 2/1987 Kanter .
4,789,861 12/1988 Baggett et al. .
4,924,230 5/1990 Martin .

Primary Examiner—T. H. Tubbesing
Attorney, Agent, or Firm—Burns, Doane, Swecker & Mathis

[57] ABSTRACT

A method of detecting the division of a radar target can detect a target, for instance caused by the release of a weapon from an aircraft which is tracked by a monopulse radar whose antenna is aligned onto the target with the aid of azimuth and/or elevation difference signals. Division of the radar target can be detected irrespective of whether the target is equipped with and uses an interference transmitter, by establishing a search channel in the radar difference channels. This channel has a sensitivity which is very low in a direction towards the tracked target, but which increases rapidly in directions which deviate somewhat from the direction towards the target. The search channel can be established by comparison of the absolute values of the signal levels in the difference channels with a threshold value.

13 Claims, 5 Drawing Sheets

METHOD OF DETECTING THE DIVISION OF A RADAR TARGET

FIELD OF THE INVENTION

The present invention relates to a method of detecting the division of a radar target, for instance caused by the release of a weapon from an aircraft, wherein target tracking is effected with a monopulse radar whose antenna is directed onto the target with the aid of azimuth and/or elevation difference signals.

BACKGROUND OF THE INVENTION

The weapon systems of attack aircraft have become more and more advanced, using weapons which are released from the aircraft at progressively further distances from the contemplated targets. As a result, the role of the air defense has gradually changed to one of combatting weapons that have been released from aircraft, for instance glide bombs, instead of combatting the actual aircraft itself. The ability of the air defenses to determine the position of an attacking aircraft or the position of the weapon released therefrom is based, to a large extent, on search radar and fire-control radar. The latter radar system initiates tracking of an attacking aircraft when the aircraft is far away. If the plane releases a so-called distance weapon at a point which is outside the range of the air defense artillery, it is essential that the radar is able to detect this occurrence and then shift target tracking to the actual weapon itself, so that the weapon can be shot down before it reaches its target.

It is difficult to detect the release of a weapon when the attacking aircraft is equipped with interference transmission equipment which disturbs the function of the radar. Transmission of noise within the radar frequency band is the most common form of interference, which renders the reflected pulses undetectable. This knocks-out the range finding ability of the radar. It is known to switch the radar to an angle tracking mode on the interference source in situations such as these, in which case the radar is used solely as a receiver. U.S. Pat. No. 4,136,343 describes a monopulse radio tracking system and a method a plurality of targets with the aid of a monopulse radar system installed on a target-tracking robot for the purpose of guiding the robot to a desired target, e.g. an aircraft. The radar is used as a receiver for signals which are transmitted from the ground and reflected by one or more enemy targets. The signals received are processed in a particular manner to establish whether the signals originate from one or from two targets located within the range covered by the radar antenna.

SUMMARY OF THE INVENTION

The object of the present invention is to provide a method for detecting the division of a radar target, which can also be used when the radar target uses interference transmission equipment to disturb the function of the radar. This object is achieved with a search channel which utilizes the radar's own pulses and which is established in at least one of the difference channels of the radar. This allows searching to be effected within a limited space around the radar target, said space having a center line which is directed towards the target. The sensitivity of the search channel is extremely low in a direction towards the target, but increases rapidly in directions which deviate slightly from the target direction. A maximum is obtained with standard types of antenna with a deviation of between one-half of a degree and one degree. Division of the target into multiple sources, caused for instance by the release of a weapon, can likely be detected in at least one of the radar difference channels.

BRIEF DESCRIPTION OF THE DRAWINGS

The invention is described in more detail below with reference to the accompanying drawings, in which.

DETAILED DESCRIPTION OF THE PREFERRED EMBODIMENTS

Figure 1:
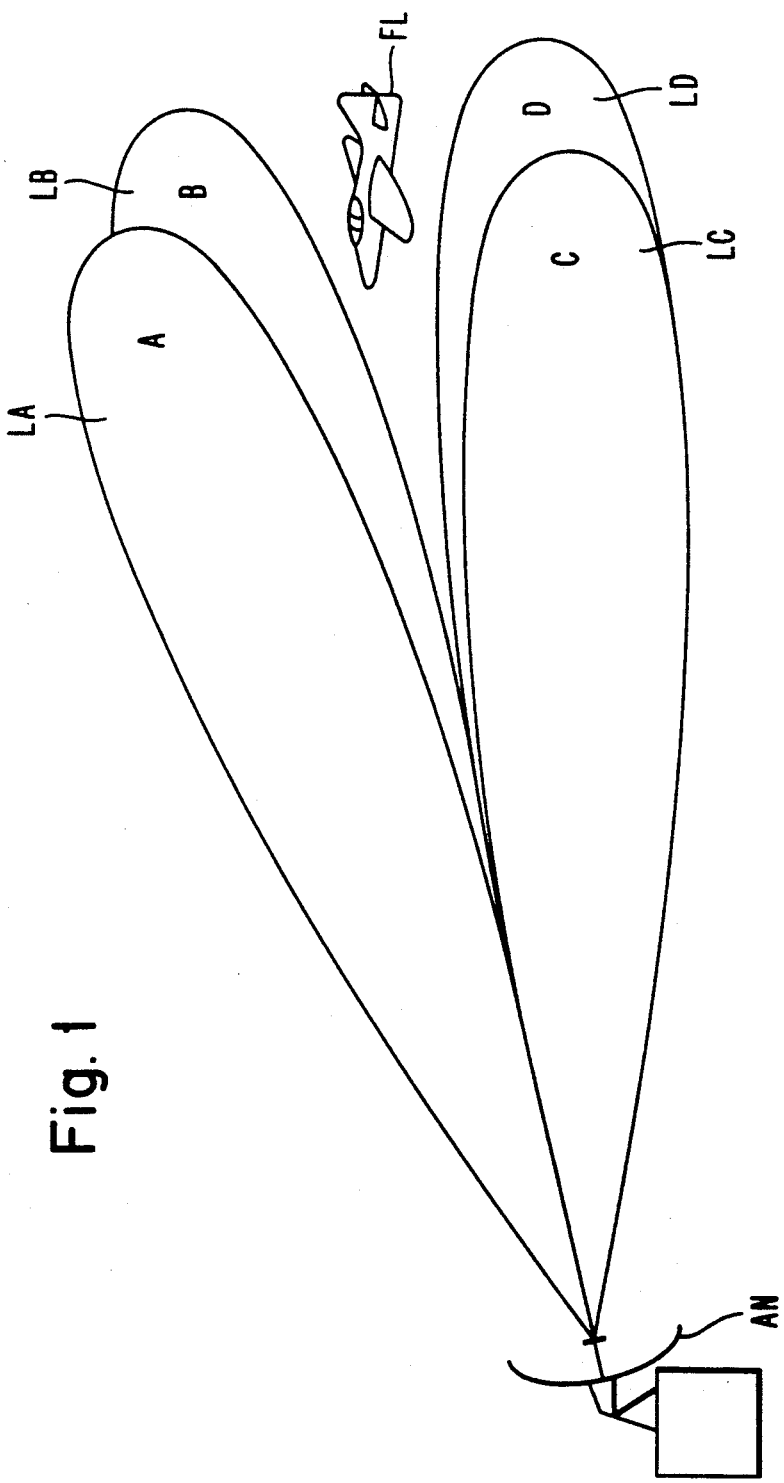
FIG. 1 is a lobe diagram for four antenna elements in the antenna of a monopulse radar system.

A monopulse radar system will normally include an antenna consisting of four antenna elements. FIG. 1 shows an example of a lobe diagram for the four antenna elements of such an antenna. The antenna is referenced AN, and the four lobes are referenced LA, LB, LC and LD. An aircraft onto which the radar is directed is referenced FL. The letters A-D in the lobs LA-LD represent signals that have been received by respective antenna elements. These signals are combined in a known manner to form a sum signal, $A+B+C+D$, and elevation difference signals $(A+B)-(C+D)$, and azimuth difference signals, $(A+C)-(B+D)$.

Figure 2:
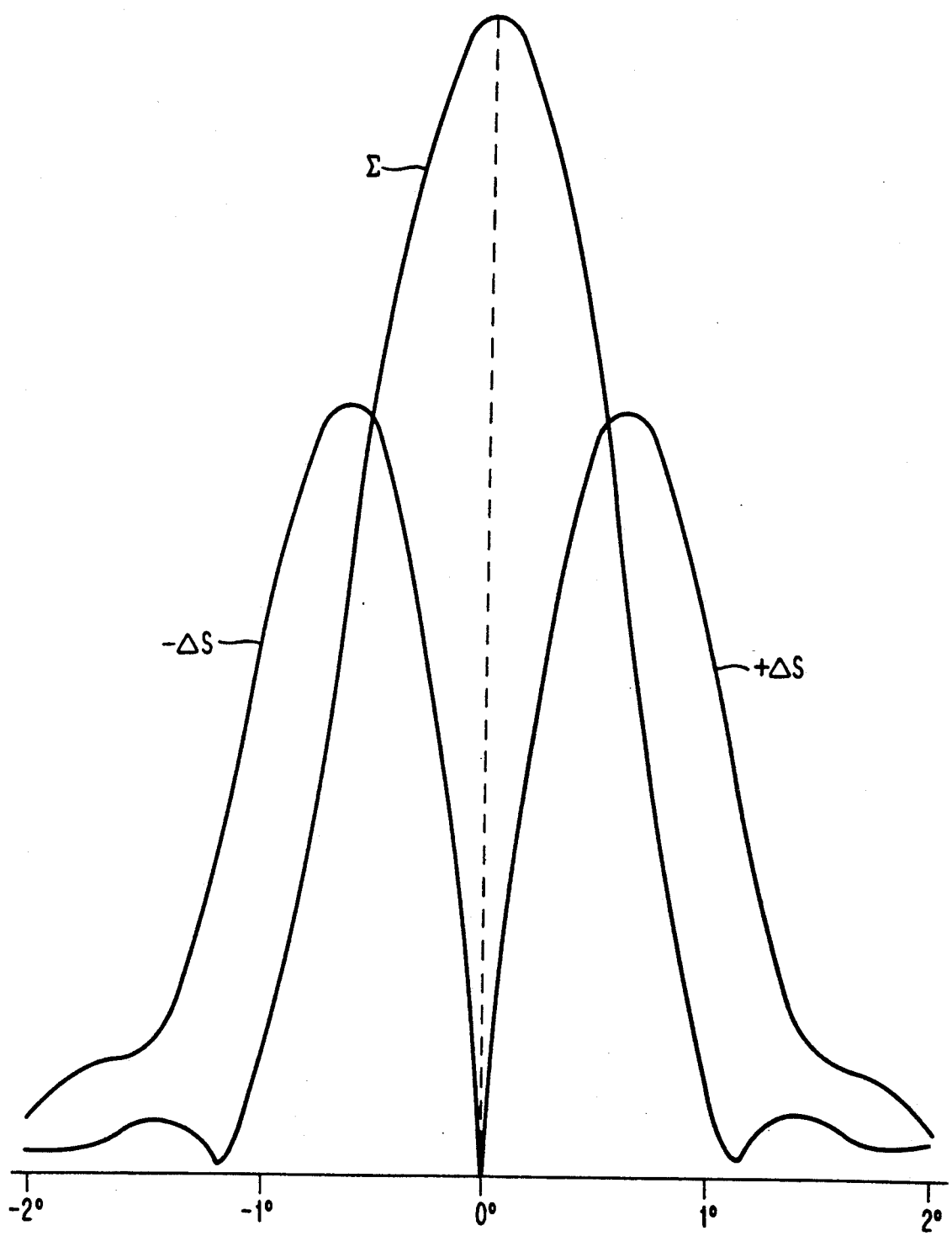
FIG. 2 is a typical lobe diagram for the sum channel and one of the difference channels in a monopulse radar system.

FIG. 2 illustrates a typical sum channel lobe diagram and one of the difference channels in a monopulse radar system. A similar diagram is also shown in the aforesaid prior publication U.S. Pat. No. 4,136,343. The reference sign $\Sigma$ identifies the sum lobe, and the reference signs $-\Delta s$ and $+\Delta s$ identify the azimuth difference lobes in directions which deviate from the center line in one or the other direction. The elevation difference lobes have essentially the same configuration as the azimuth difference lobes. As will be seen from the diagram, the difference channels have a very low sensitivity in directions towards the target, i.e. towards the aircraft. This direction is referenced 0 degrees. The sensitivity of the difference channels increases rapidly, however, in directions which deviate slightly from the target direction. The maximum sensitivity of an antenna having the lobe diagram shown in FIG. 2 is obtained at a deviation of about 0.6 degrees.

Figure 3:
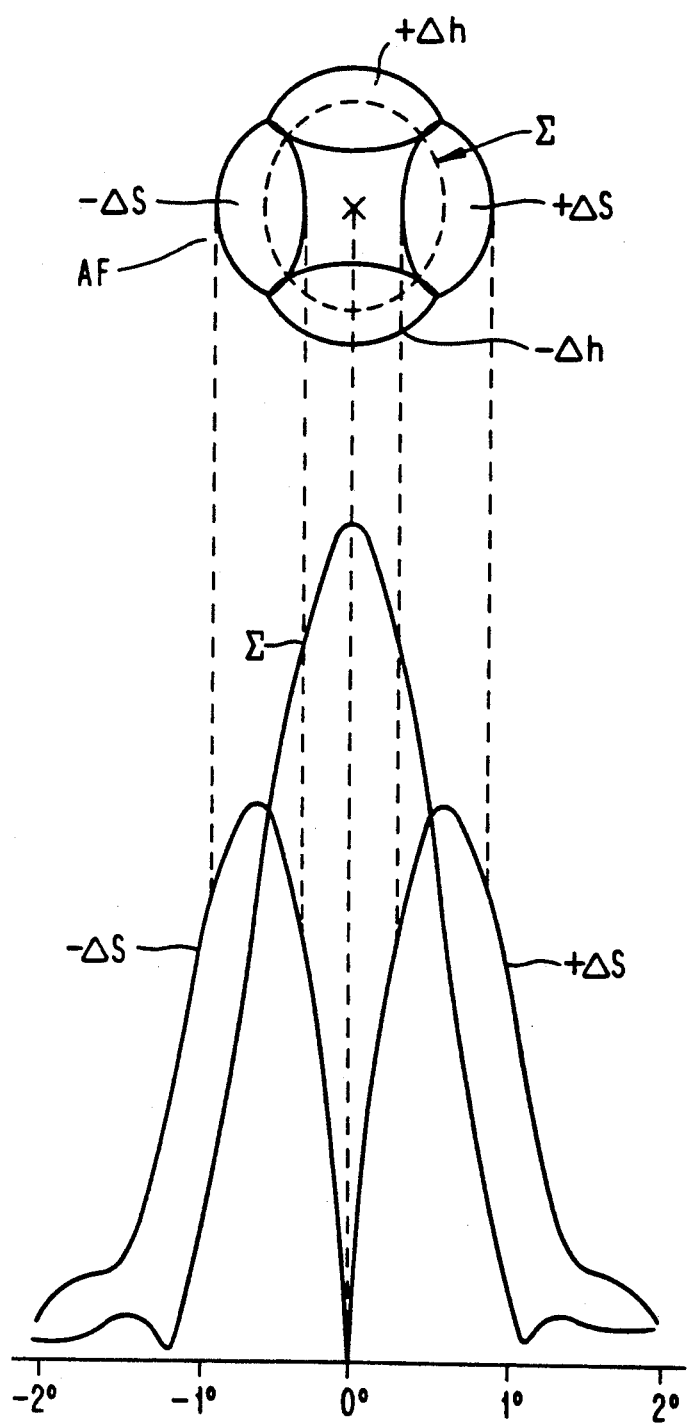
FIG. 3 is a lobe diagram similar to the lobe diagram of FIG. 2, but also shows the area covered by an antenna, as seen immediately from the front.

FIG. 3 illustrates a lobe diagram similar to the lobe diagram illustrated in FIG. 2. FIG. 3, however, also includes an example of the area covered by an antenna, as seen immediately from the front. This area is referenced AF and comprises five parts. A circular part $\Sigma$ shows the area covered by the sum lobe. Two elliptical parts $+\Delta s$ and $-\Delta s$ show the areas covered by the azimuth difference lobes, and two elliptical parts $+\Delta h$ and $-\Delta h$ show the areas covered by the elevation difference lobes. As will be understood from FIG. 3, the sizes of the elliptical parts are related to the strength of the signal received and to the selected channel sensitivity threshold.

When tracking a target, for instance an aircraft, the radar antenna is controlled to obtain the minimum quotient between each of the difference signals and the sum signal. When the tracked target is equipped with an interference transmitter, the target is camouflaged by the interference signals transmitted therefrom. The radar antenna is therefore aligned onto the target with the aid of the signals transmitted by the interference transmitter, which makes it impossible to discern the division of the target.

According to the present invention, however, the division of a radar target into a multiple of sources, for example caused by the release of a weapon from a target aircraft, is detected by establishing a search channel in the radar difference channels. It is possible with the aid of such a channel to detect division of the target irrespective of whether the target, e.g. an aircraft, is equipped with and uses an interference transmitter. This is explained by the fact that a normal search sensitivity with range measuring can be obtained in the radar difference channels, i.e. around the radar target, with the aid of the radar's own transmitted pulses. This is due, in turn, to the fact that the radar has already been aligned onto the target tracked by the radar, and consequently the target is unable to give rise to a signal in the difference channels. It may be suitable, although not necessary, for the search channel to search in a plurality of the radar range bins, from relatively small ranges up to relatively large ranges. Searching may optionally be effected within all range boundaries, i.e. from short ranges up to the instrumented range of the radar.

A tracked target that is equipped with an interference transmitter will give rise to a very low signal amplitude in the difference channels; see for instance the lobe diagram in FIGS. 2 and 3. In the event of a weapon being released, for instance from an aircraft, the weapon will slide out laterally and/or vertically in relation to the center line of the sum lobe. As will be seen from the lobe diagram, the signal amplitude in the difference channels will increase rapidly and will have already reached a maximum when the direction to the released weapon deviates from the direction to the tracked target by one-half to one degree. Thus, the search channel enables a limited space to be surveyed around the target, e.g. a conical space around an aircraft. This space may, for instance, have a cross-section which coincides with the area formed by the four elliptical areas $+\Delta s$, $+\Delta h$, $-\Delta s$ and $-\Delta h$ in the part AF in FIG. 3.

Figure 4:
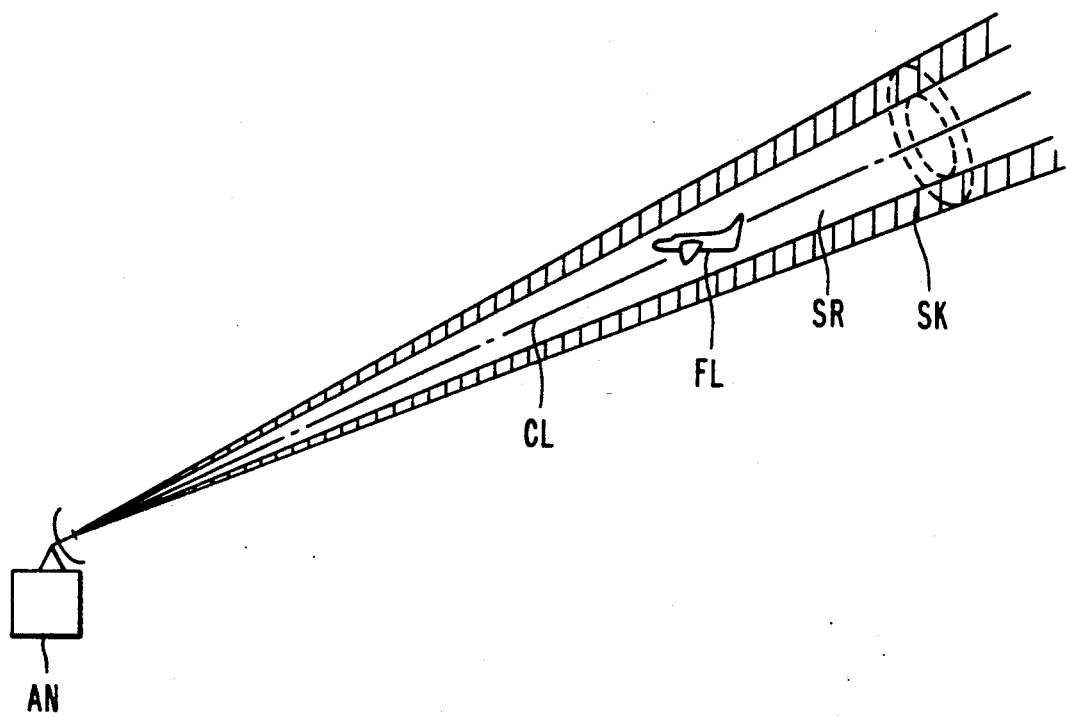
FIG. 4 illustrates a search channel used in accordance with the invention.

FIG. 4 illustrates how the search channel is located in space in relation to a tracked aircraft. As in the FIG. 1 illustration, an antenna AN is aligned onto an aircraft FL. The aircraft thus lies on a center line CL of a conical space SR, in which objects will give rise only to a very low signal amplitude in the radar difference channels. In two dimensions this space corresponds to the area located, for instance, between the difference lobes $-\Delta s$ and $+\Delta s$ in the lobe diagram shown in FIG. 2. The reference sign SK identifies a restricted space located outside the conical space SR and in which any object present will give rise to a high signal amplitude in the radar difference channels. This space corresponds to the difference lobes $-\Delta s$ and $+\Delta s$ in FIG. 2 and, as will be evident from above, an outer surface of conical configuration. The space SK is surveyed with the search channel used in accordance with the invention, and consequently an object released from the aircraft and thereafter moving in a direction which deviates from the direction of the center line CL will give rise to a radar echo which exceeds a predetermined strength. The object will therefore be detected the search channel when the object passes through the space SK.

The strength of the received echo signals is also determined by the strength and direction of the signal transmitted from the radar, in addition to the sensitivity of the receiver channel. The sensitivity function of the total system in space is equal to the illumination function multiplied by the receiver function. In normal use of the radar system, transmission is effected with the aid of the antenna sum lobe. This procedure can also be applied when practicing the inventive method. As will be understood from FIGS. 2 and 3, the maximum total sensitivity of the search function will be displaced slightly towards the center line.

An alternative transmission process in conjunction with searching according to the present invention is using the radar difference channels also when transmitting. This affords the advantage that the transmitted energy is concentrated to the space surveyed and not wasted to a large extent in a direction towards the interference transmitter. This results in slightly improved sensitivity and causes the maximum sensitivity function of the total system to coincide with the maximum of the difference lobes.

Figure 5:
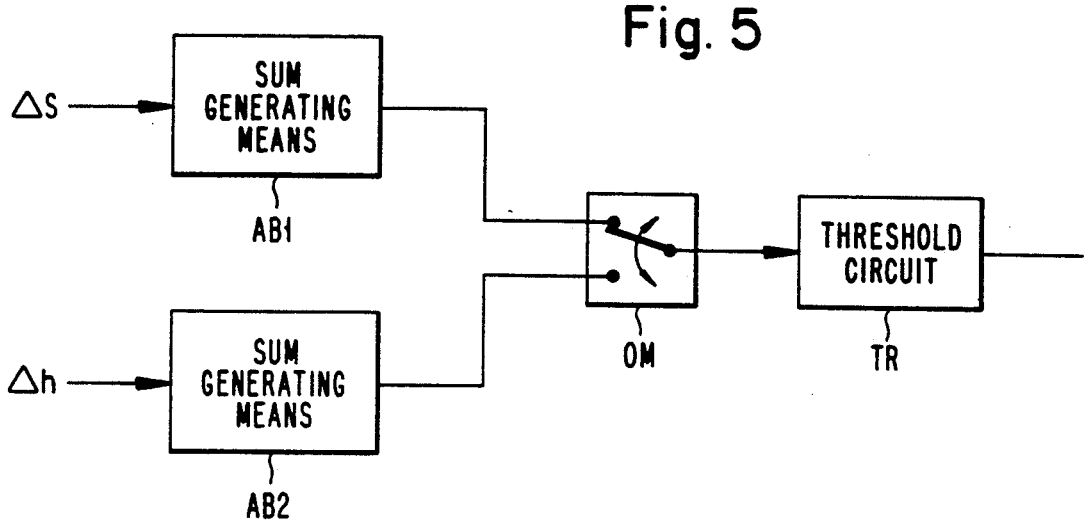
FIGS. 5 and 6 illustrate devices which can be used when carrying out the inventive method.
Figure 6:
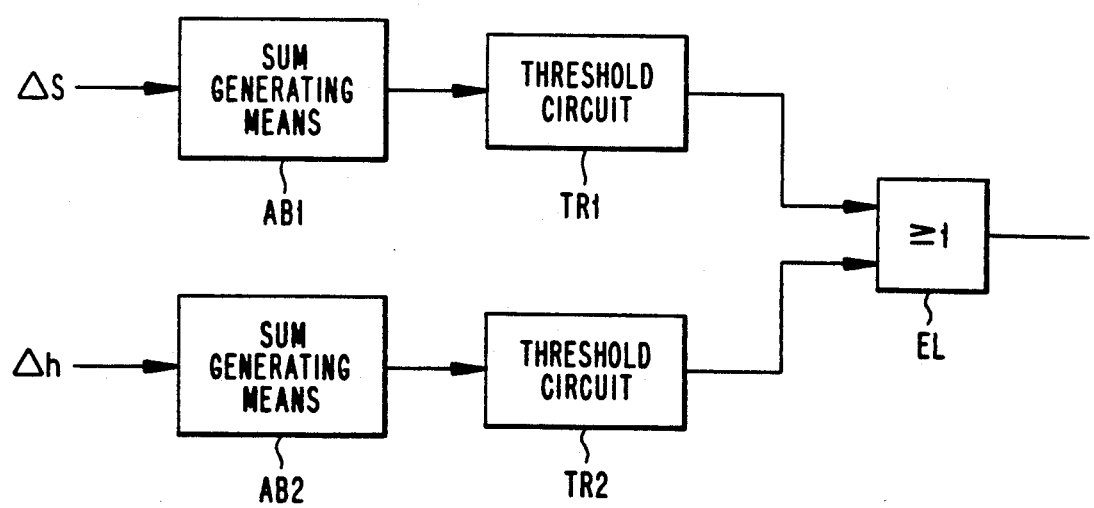

Establishment of the search channel is effected by suitable monitoring of the signal levels in the difference channels. An object which glides out laterally and/or vertically from, e.g., an aircraft, will be detected in at least one of the difference channels. Monitoring can therefore be effected, for example, by alternately comparing the absolute values of the signal levels in the two difference channels with a threshold value, or by comparing the absolute values of both signal levels continuously and simultaneously with a respective threshold value. A decision to the effect that the radar target has divided into multiple sources is taken when at least one of the absolute values exceeds the threshold value. FIGS. 5 and 6 illustrate examples of devices which can be used in conjunction with deciding whether the target has divided.

The device illustrated in FIG. 5 is intended for use when the signal levels are alternately compared with a threshold value. The azimuth difference signals and the elevation difference signals are referenced $\Delta s$ and $\Delta h$ and are each applied to an absolute sum generating means, AB1 and AB2. The output signals from these means are applied to a switch OM which is constructed so as to apply the signals alternately to a threshold circuit TR, the output signal of which is used as a basis for the aforesaid decision. More specifically, the switch OM is preferably constructed to apply to the threshold circuit TR those signals which derive from the azimuth difference signals for each alternate radar pulse, and to apply to said threshold circuit those signals which derive from the elevation difference signals for each alternate radar pulse. The time between these switching functions is therewith on the order of up to one millisecond.

Alternatively, the difference signals $\Delta s$ and $\Delta h$ can be applied to the switch OM directly, i.e. prior to forming the absolute values. In this case, only one absolute value generating means is required, which is preferably connected downstream of the switch OM.

The device illustrated in FIG. 6 is intended for use when the absolute values of both difference signals are each compared simultaneously with a respective threshold value. In this case, two absolute value generating means AB1 and AB2 and two threshold circuits TR1 and TR2 are used. The outputs of the threshold circuits are connected to an OR-gate EL, the output signal of which signifies that at least one of the threshold values has been exceeded.

As will be understood, the invention is not restricted to the described and illustrated embodiments and modifications can be made within the scope of the following Claims. Instead of comparing the absolute values of the difference signals Δs and Δh individually with a threshold value, it is, for instance, conceivable to combine the difference signals in different ways prior to making the comparison. This combination can be achieved by adding together the absolute values of the difference signals. The sum obtained can then be compared with a threshold value.

The inventive method may also be applied for detecting the presence of two aircraft which have flown in such close proximity to one another as to appear as a single coincident radar target which divides into two sources. The method can also be used, of course, on radar targets other than aircraft, for instance helicopters or ships. When the radar target is a ship, only the azimuth difference signals of the monopulse radar need be used in certain instances for aligning the antenna onto the target. In this case, the tracking channel need only be adjusted in the difference channel concerned with lateral movement.

I claim:

1. A method of detecting the division of a radar target, for instance caused by the release of a weapon from an aircraft, wherein target tracking is effected with a monopulse radar whose antenna is directed onto the target with the aid of azimuth signals and/or elevation difference signals, comprising the steps of:
   establishing a search channel in at least one of the radar difference channels for searching with the aid of the pulses transmitted by the radar, including searching in a limited space around the target; and
   deciding whether a division of the target has occurred when a radar echo which exceeds a predetermined strength occurs in the search channel.

2. A method according to claim 1 wherein said step of establishing the search channel includes alternately comparing the absolute values of the signal levels of the two difference signals with a threshold value; and determining when one of the absolute values exceeds the threshold value.

3. A method according to claim 2, wherein said step of comparing includes comparing the absolute values of the signal levels of the azimuth and the elevation difference signals with the threshold value for each alternate radar pulse.

4. A method according to claim 1, wherein said step of establishing the search channel includes comparing each of the absolute values of the signal levels of both difference signals simultaneously with a respective threshold value; and determining when one of the thresholds is exceeded.

5. A method according to claim 1, further including the step of transmitting the radar pulses in the difference channels.

6. A method according to claim 2, further including the step of transmitting the radar pulses in the difference channels.

7. A method according to claim 3, further including the step of transmitting the radar pulses in the difference channels.

8. A method according to claim 4, further including the step of transmitting the radar pulses in the difference channels.

9. A method of detecting division of a radar target in a monopulse radar tracking system comprising the steps of:
   searching at least one search channel in at least one radar difference channel for a radar echo; and
   comparing said radar echo to a predetermined threshold, wherein if said radar echo exceeds said predetermined threshold a second target is divided from said first target.

10. A method of detecting division of a radar target in a monopulse radar tracking system comprising the steps of:
    tracking a target with a monopulse radar antenna;
    detecting azimuth signal levels and elevation difference signal levels in a search channel surveyed in an area proximate to said target using radar pulses transmitted by said antenna; and determining whether said target is divided based on said detected azimuth signal levels and said detected elevation difference signal levels detected in said search channel.

11. The method according to claim 10 wherein said step of determining includes the step of alternately comparing absolute values of said detected elevation difference signal levels with a threshold wherein a second target is detected when one of the absolute values exceeds said threshold.

12. The method according to claim 11 wherein said step of comparing includes comparing absolute values of said detected azimuth signal levels and said detected elevation difference signal levels with said threshold for each alternate one of said radar pulses.

13. The method according to claim 10 wherein said step of determining includes the step of comparing each absolute value of each of said detected elevation difference signal levels simultaneously with a different one of a plurality of thresholds, wherein a second target is detected when one of said thresholds is exceeded.

* * * * *